United States Patent [19]

Shimura et al.

[11] Patent Number: 4,902,576
[45] Date of Patent: Feb. 20, 1990

[54] HIGH TEMPERATURE SLIDING ELEMENT AND METHOD FOR PREVENTING HIGH TEMPERATURE SLIDING WEAR

[75] Inventors: Yoshio Shimura, Aichi; Yoshiyuki Mizutani; Akio Isogai, both of Nagoya, all of Japan

[73] Assignee: Kabushiki Kaisha Toyoto Chuo Kenkyusho, Aichi, Japan

[21] Appl. No.: 919,455

[22] Filed: Oct. 16, 1986

[30] Foreign Application Priority Data

| Oct. 17, 1985 | [JP] | Japan | 60-231866 |
| Oct. 18, 1985 | [JP] | Japan | 60-233840 |
| Oct. 7, 1986 | [JP] | Japan | 61-238229 |

[51] Int. Cl.$^4$ .......................................... C04B 41/87
[52] U.S. Cl. ................................... 428/472; 428/698
[58] Field of Search ............... 428/698–701, 428/469, 472

[56] References Cited

U.S. PATENT DOCUMENTS

| 3,922,444 | 11/1975 | Nakamura | 428/698 X |
| 4,169,637 | 10/1979 | Voitas | 428/698 X |
| 4,260,658 | 4/1981 | Erickson | 428/698 X |
| 4,312,899 | 1/1982 | Lahmann | 428/698 X |
| 4,492,765 | 1/1985 | Buljan | 428/698 X |
| 4,522,453 | 6/1985 | Lammer et al. | 428/698 X |

FOREIGN PATENT DOCUMENTS

| 3509572 | 7/1986 | Fed. Rep. of Germany | 428/701 |
| 0038350 | 3/1984 | Japan | 428/698 |

*Primary Examiner*—Nancy A. B. Swisher
*Attorney, Agent, or Firm*—Burns, Doane, Swecker & Mathis

[57] ABSTRACT

A high temperature sliding element is provided with a metallic film formed of any one of metals Ni, Mn, Cr, Fe and Co, and alloys of these metals on a sliding surface of a substrate of carbide ceramics or nitride ceramics in accordance with physical vapor deposition. When the substrate and a sliding counterpart ceramic member are slid in a high temperature atmosphere 500° C. or higher with the metallic film intervening therebetween, wear due to sliding motion between the substrate and the counterpart ceramic member can effectively be reduced. The metallic film forms an oxidized sliding surface layer at the high temperature.

6 Claims, 2 Drawing Sheets

Sample No. 2

Sample No. 12

Sample No. 13

Sample No. C2

Sample No. C7

Sample No. C8

HIGH TEMPERATURE SLIDING ELEMENT AND METHOD FOR PREVENTING HIGH TEMPERATURE SLIDING WEAR

BACKGROUND OF THE INVENTION

1. Field of the Invention

The present invention relates generally to high temperature sliding elements for use in sealing and bearing elements, and more specifically to ceramic high temperature sliding elements and a method for preventing the same from wear at high temperatures, wherein high temperature sliding characteristics can be improved by modifying the surface of ceramics without deteriorating the intrinsic features of ceramics having an excellent heat resistance.

2. Description of the Prior Art

As sliding elements used in a high temperature atmosphere such as sealing and bearing elements, conventionally, there have been employed heat resisting metallic materials of cobalt (Co) or nickel (Ni) base alloys. At present, however, the upper allowable temperature limit is about 800° C. from the standpoint of heat resistance related to oxidation resistance, high temperature strength or the like.

Accordingly, there have been attempted the use of ceramic materials, because of its excellent physical, chemical and mechanical properties in a high temperature atmosphere as compared with metals. However, the ceramics which are generally believed to be antiwear material are practically not excellent in wear resistance, rather involving such drawbacks that wear increases markedly with increasing temperature. For the reason as described above, ceramic materials having satisfactory high temperature characteristics when used as structure materials are not available as high temperature sliding elements when used as they are.

In the case where used as sliding elements in a high temperature atmosphere, ceramic materials suffer wear at local high contact pressure portions and produce wear debris. Due to abrasive wear by the wear debris and an increase of the surface roughness, wear is accelerated in both the sliding element and the counterpart. In the case where the counterpart is made of a material such as a metal softer than ceramics, since the produced wear debris is embedded or accommodated on the surface of the counterpart, the abrasive wear by wear debris can be suppressed to some extent. However, in the case where the counterpart is also made of ceramics, since the wear debris is not readily embedded or accommodated, wear increases markedly, thus causing change in dimensions to such an extent that cannot be practically acceptable.

To solve the above problem, so far various methods have been developed, and some sliding elements which can improve the antiwear properties have been proposed. One of them is a silicon nitride material obtained by adding boron nitride (BN) to ceramic material as solid lubricant and by sintering the surface layer thereof (Japanese Patent Kokai Publication No. 59-137375). In this ceramic material, it is true that the wear characteristics can be improved to some extent. However, there still exists another problem in that high temperature characteristics, in particular high temperature strength, which should be inherently satisfied by the ceramic material are lowered.

SUMMARY OF THE INVENTION

With these problems in mind, therefore, it is a primary object of the present invention to provide a sliding element excellent in wear resistance in a high temperature atmosphere.

It is another object of the present invention to provide a method of preventing wear of ceramic sliding element due to sliding motion in a high temperature atmosphere.

It is a further object of the present invention to provide a method of sliding a high temperature sliding element.

Other objects will become apparent in the entire disclosure.

The present inventors have devotedly researched the way of solving the aforementioned problems involved in the prior art and repeatedly made various systematic experiments, thus coming to a conclusion proposed by the present invention.

More specifically, a high temperature sliding element of the first aspect of the present invention comprises a carbide or nitride ceramic substrate member, a metallic film formed on said substrate member by physical vapor deposition, said metallic film being formed of at least one selected from the group consisting of nickel, manganese, chromium, iron, cobalt and alloys thereof, and a sliding surface layer to be slid against a counterpart ceramic member, said sliding surface layer being in the surface of said metallic film, thereby preventing sliding wear of said sliding element when slid against said counterpart ceramic member at a temperature of 500° C. or higher.

The high temperature sliding element of the present invention has an excellent wear resistance in a high temperature atmosphere.

Further, according to the second aspect of the present invention there is provided a method of preventing wear due to sliding motion of a ceramic sliding element relative to a sliding counterpart member in a high temperature atmosphere, which comprises:

forming a metallic film on a carbide or nitride ceramic substrate member by physical vapor deposition, said metallic film being formed of at least one selected from the group consisting of nickel, manganese, chromium, iron, cobalt and alloys thereof and having a sliding surface layer in the surface thereof to be slid against a counterpart ceramic member, heating said sliding surface layer for oxidization, and sliding said sliding surface layer against said counterpart ceramic member, thereby preventing sliding wear of said ceramic members when slid at a temperature of 500° C. or higher.

Owing to this method, it is possible to prevent wear caused by sliding motion of the ceramic sliding member relative to the counterpart even in a high temperature atmosphere 500° C. or higher. The metallic film is oxidized during sliding to form an oxide film which assures a long durability and heat resistance, i.e., the resultant oxide film layer serves as the sliding surface layer.

In the following the preferred embodiments of the present invention will be disclosed with reference to the accompanying drawings.

BRIEF DESCRIPTION OF THE DRAWINGS

FIGS. 4 to 6 show wear scars of Sample Nos. C2, C7 and C8 prepared for comparison with Sample Nos. 2, 12, and 13 of the present invention.

DETAILED DESCRIPTION OF THE PREFERRED EMBODIMENTS

Figure 1:
FIGS. 1 to 6 are diagrams showing cross-sectional profiles representative of wear scars on Sample Plates A after friction and wear tests of Sample Nos. 2, 12, 13, C2, C7 and C8 have been effected, respectively.

A high temperature sliding member of the present invention will first be described. The substrate member of the high temperature sliding element of the present invention is ceramic sintered body made of carbide and/or nitride as the main material which may include a minor amount of sintering aids. Here, carbide ceramics such as silicon carbide (SiC) is used as the carbide ceramic sintered body, while nitride ceramics such as silicon nitride ($Si_3N_4$) is used as the nitride ceramic sintered body. These ceramics are excellent in heat resistance, and further provided with excellent physical, chemical and mechanical properties even in a high temperature atmosphere.

Further, a metallic film formed on the surface assigned to form a sliding surface (may be referred to as "sliding surface", too) of the substrate member made of carbide and/or nitride ceramics is oxidized at high temperatures due to reaction with oxygen in the atmosphere and serves as a thin film lubricant which provides a wear resistance for the ceramic substrate member. The metallic film is formed of at least one of nickel (Ni), manganese (Mn), chromium (Cr), iron (Fe) and cobalt (Co) or an alloy of these metals. Such alloys include typically alloys essentially consisting of said metals, however, may include alloys based on at least one of said metals (no less than 60% by weight, preferably no less than 80% by weight) with other elements. The presence of Cu is not preferred, but a minor amount (e.g., about 3% by weight) would be acceptable.

The thickness of the metallic film should be such that it is thick to such an extent as to provide a wear resistance for the ceramic substrate member as the high temperature sliding element and to exceed the surface roughness of the ceramic substrate member. Thus the upper limit is not severely limited, and the thickness thereof is preferably from about 0.1 to 5 μm. This is because when the film thickness of the metallic film is less than about 0.1 μm, it is difficult to protect the substrate member from being damaged by a shearing force generated on the friction surface during sliding motion, and when more than 5 μm, the dimensions (or surface configuration) of the element vary at a high temperature due to metal melting or oxidation and therefore the elements are not serviceable as slidable elements. A more preferred thickness is 0.1–1 μm.

Further, the metallic film formed on the sliding surface of the ceramic substrate member is softer than the substrate material between room temperature and high temperatures. Although being oxidized from the surface at high temperatures, the metallic film can prevent direct contact between the ceramic substrate member and a ceramic member as the sliding counterpart at the initial stage of friction, in particular, and promote the fitness (or adaptation) between two friction surfaces. Further, this metallic film provides a high wear resistance at a temperature of 500° C. or higher at which wear of the substrate member otherwise generally increases markedly.

According to the kind of the metallic film to be used, a metal silicide layer might be formed at the boundary between the metallic film and the substrate, because the metal reacts upon silicon produced by a slight thermal decomposition of the substrate at high temperatures as follows:

In general, the strength of this layer is relatively weak at high temperature, and therefore the improvement of the wear resistance by the coated metallic film is deteriorated when this layer is formed too thick. However, oxidation proceeds from the metal film surface simultaneously when the above silicide formation reaction proceeds, and at the time when the coated metal is consumed by both the reactions, these reactions will cease. Therefore, with respect to both the reactions, the thinner the coated metallic film is, and the higher the temperature at which oxidation rate is high is, the thinner the silicide layer will be in thickness, so that the wear resistance can be improved. In the case where metals which are apt to form the silicide layer are used, it is desirable to use the substrate member of nitride ceramics, because the silicide forming reaction is less active where the substrate member is made of nitride ceramics than where made of carbide ceramics. This is because nitride ceramics is not readily decomposed at temperatures of at least 1400° C. or below as compared with carbide ceramics. Further, when a metal which easily forms the silicide layer is coated on the carbide ceramics substrate member, for instance as when a Ni film is formed on a silicon carbide ceramics, it is preferable to use such sliding element in a high temperature atmosphere 800° C. or higher where the oxidation rate is high. This is because the wear resistance can be improved markedly at a temperature of 800° C. or higher. Further, in this case, it is possible to obtain a more desirable high temperature sliding element by reducing the thickness of the coated metallic film down to 1 μm or less. In contrast with this, when the substrate member is made of nitride ceramics or when a metal (Cr, Mn, Fe, Co) which does not readily form the silicide layer is coated on a carbide ceramics substrate, since the silicide layer is not easily formed, there exists no temperature limit upon use with respect to the above-mentioned reaction. However, in these cases, the wear resistance is improved significantly when these elements are used in a high temperature atmosphere 800° C. or higher where the oxidation rate is high.

The high temperature sliding element of the present invention is provided with a metallic film formed of any one of nickel (Ni), manganese (Mn), chromium (Cr), iron (Fe) and cobalt (Co) or alloys of these metals on the surface of the above-mentioned ceramic substrate member.

The coating or formation of the metallic film on the surface of the ceramic substrate member is achieved on the basis of physical vapor deposition method. This method may be any of vacuum deposition method, sputtering method, ion plating method, etc. without being specified, as far as a metallic film useful as a high temperature sliding element can be coated or formed on the surface of the ceramics substrate member. A combination of these methods may be applied, or a further combination of one of said methods as an undercoating and a further overcoating with plating methods (electrolytic or chemical) may be applied so far as the adhesion and the layer smoothness are satisfied.

A typical method of manufacturing the high temperature sliding element according to the present invention will be described hereinbelow.

First, ceramics having desired properties corresponding to the object of high temperature sliding members is formed into the substrate members in accordance with the conventional method of manufacturing ceramics. Generally, the surface assigned to form the sliding surface is precision-finished to a surface suitable for the sliding surface wherein a surface roughness of 5 μm or below in Rz is preferred (more preferred is 1 μm or below in Rz). Then, the resultant ceramic substrate members are disposed within a vacuum deposition instrument or a sputtering instrument, etc. to coat a desired metallic film on the surface of the ceramic substrate members on the basis of the physical vapor deposition method, that is, to obtain high temperature sliding elements according to the first aspect of the present invention.

The sliding element according to the first aspect of the present invention may be such that it comprises an oxide layer as the sliding surface layer in the metallic film. Such oxide layer is formed by heating the sliding element.

The method of preventing sliding wear according to the second aspect of the present invention is a method wherein the sliding element typically according to the first aspect of the present invention and a sliding counterpart of the ceramic member mutually slid at a high temperature. Namely, in this method a pair of sliding ceramic members is mutually slid, which comprises:

providing, as one part of the sliding ceramic members, a ceramic substrate member which has been obtained by sintering carbide or nitride as the major material, forming said metallic film on the surface of said ceramic substrate member by physical vapor deposition to form a sliding surface layer as the surface of the metallic film, forming an oxide layer by heating said sliding surface layer at least on the surface thereof, and sliding said sliding surface layer formed of the oxide layer against the counterpart ceramic member under the condition that at least the sliding surface or the ambient atmosphere surrounding its proximity is at 500° C. or higher, thereby promoting fitness and accommodation of the sliding surface between the sliding counterpart ceramic member and the sliding surface layer in the metallic film to prevent the sliding wear of both the ceramic members.

The formation of the oxide layer at the sliding surface layer in the metallic film is effected by heating at least the sliding surface layer or its proximity to a temperature such that the oxidation of the metal film occurs. Therefore, the heating may be effected by only partly heating the relevant portion where the oxide layer is to be formed, or the surrounding atmosphere thereof may be heated, to a predetermined temperature. Besides, the heating may be friction heating to be produced by slide friction against the sliding counterpart ceramic member.

The reason why the high temperature sliding element according to the present invention has the above-mentioned effect has not yet been completely clarified. However, the mechanism can be considered as follows:

Carbide or nitride ceramics used as the substrate member of the high temperature sliding element of the present invention is excellent in heat resistance, reduced lowering in mechanical properties due to increase in temperature, sufficiently strong even in a high temperature atmosphere of 800° C. or higher, small in thermal expansion coefficient, and therefore small in heat deformation. On the other hand, the metallic film formed on the surface of the ceramic substrate member is a metal or an alloy softer than the substrate at high temperatures and is well fitted to and mates with the ceramic base body (ceramic substrate). Further, although the metallic film reacts with oxygen under a high temperature atmosphere to form an oxide film, the film will not easily react with the substrate. Even if the film reacts with the substrate, a layer formed by such reaction is thin, and the resultant layer is never so brittle, so that an oxide layer of only the coated metal or a complexed-oxide layer (or complex compound) of metal and Si as the substrate component is formed on the surface.

Therefore, when this high temperature sliding element is used as a sliding element in a high temperature atmosphere, a load applied to the friction surface during sliding motion can be supported by the base of the ceramic substrate member, and a shearing force due to friction is absorbed by a high temperature oxidation layer at an outermost surface of the thin metallic film softened due to high temperature. Further, local high pressure contact or unbalanced contact sliding surfaces which inevitably occur because of the manufacturing precision limit can quickly be absorbed by deformation or slight wear of this oxidation layer. Accordingly, hard substances such as ceramic wear debris which will promote wear will not be produced on the sliding surface, so that it seems that the wear resistance between the substrate member and the sliding counterpart member can be improved significantly, and excellent high temperature sliding characteristics can be obtained. When the inventive sliding element is used starting from a low temperature below 500° C., an accommodated surface may be produced. However, if a hard oxide film were coated in lieu of the metal film, damages would occur on the counterpart or substrate member during the initial stage of sliding process wherein the temperature is gradually raised. In the present invention, there is no such occurrence even upon repeating use after cooling following previous use, because good accommodation has been established.

Since the high temperature sliding elements of the present invention are excellent in high temperature sliding characteristics, heat resistance, and wear resistance, it is possible to widely utilize the elements as various sliding elements in the high temperature atmosphere such as sealing material for heat exchangers, bearing material used in molten metal, bearing material for turbochargers, etc.

EXAMPLES

Some examples of the invention will now be described hereinbelow which will serve to better elucidate the invention.

EXAMPLE 1

First, as carbide ceramic substrate members, flat plates (26×26×4 mm) of a silicon carbide sintered body (SC 201 by Kyocera Corporation) were prepared. A 5 mm dia. bore was formed at the center of each of the plates, and the plates were polished to a surface roughness of 0.2 μm Rz. The ceramic substrate members were subjected to pretreatment for cleaning to remove oil or fat.

These ceramic substrate members were put in a vacuum vapor deposition instrument (JEE-5B by JEOL, LTD.); the instrument was evacuated to $10^{-3}$ Pa; the ceramics substrate members were heated to 350° to 400° C.; and metals as listed in Table 1 were coated onto the substrate members by a vacuum vapor deposition using a tungsten (W) wire basket. By the above method, high temperature sliding elements of Sample Nos. 3-7, 10 and 11 were obtained. Further, the elements of Sample Nos. 1, 2, 8 and 9 were obtained by coating nickel on the surface of the substrate members by using a sputtering instrument in which an argon (Ar) gas was used as an introduction gas and a glow discharge was effected at pressure 4Pa for one hour or longer according to the film thickness.

The obtained high temperature sliding elements were designated as Sample Plates A. On the other hand, flat plates (26×26×4 mm, surface roughness: 0.2 μm Rz) of a silicon carbide sintered body (SC 201 by Kyocera Corporation) the same as the former ceramics substrate members were machined into such a shape that an annular portion with a 25 mm dia. and a 1 mm thickness projects from one surface (friction surface portion) and further a 10 mm dia. bore was formed at the center thereof. The latter elements were designated as Sample Plates B.

Sample Plates A were mounted on a test piece holder arranged on the rotatable shaft end of a thrust collar type high temperature friction test apparatus, and Sample Plates B were mounted on a test piece holder arranged on the pressurized shaft end of the same apparatus, to conduct a friction and wear test under the test conditions as listed in Table 2. Table 1 shows the test results. The wear was obtained by measuring the change in weight of Sample Plates A and B. In this case, when Sample Plates A were heated to a high temperature, since the metallic film is oxidized and therefore the weight increases correspondingly, indices of wear rate were determined on the basis of difference in weight of Sample Plate between that measured after a test corresponding to 120 m sliding length and that measured after a test corresponding to 600 m sliding length. With respect to Sample No. 2, the cross-sectional profile of a wear scar on the Sample Plate A was recorded by a stylus contact type roughness tester. The recorded results are shown in FIG. 1. In the drawing, the reference numeral 1 denotes the outermost surface of the Sample Plate A; the numeral 11 denotes the surface of a wear scar on the Sample Plate A.

Figure 4:

For comparison, various Sample Plates A were prepared as follows: silicon carbide sintered bodies (the same as the aforementioned ceramics substrate) having no metallic film were prepared as the Sample Plates A (Sample Nos. C1 and C2); the Sample Plates A using other metals as the metallic film were prepared (Sample Nos. C3 and C4); 3 mol % $Y_2O_3$ partially stabilized zirconia ($ZrO_2$: Z201, the same dimensions, by Kyocera Corporation) was used as the substrate member of the Sample Plates A and as the Sample Plates B (Sample Nos. C5 and C6). The above sample plates for comparison were tested under the same conditions. The obtained results are shown together. Further, with respect to Sample No. C2, the cross-sectional profile of a wear scar on the Sample Plate A was obtained by a stylus contact type roughness tester. The results are shown in FIG. 4. In the drawing, the reference numeral 4 denotes the outermost surface of the Sample Plate A, and the numeral 14 denotes the surface of a wear scar on the Sample Plate A.

The test results shown in Table 1 indicate that the high temperature sliding elements according to the present invention are superior, with respect to wear resistance in a high temperature atmosphere, to other elements prepared for comparison. Note that the wear of the sliding counterpart was $4 \times 10^{-8}$ mg/mm or below (, i.e., almost zero).

Additional prolonged wear testing up to a sliding length of 10.2 km (for 850 min) at 1000° C. on a sample coated with Ni metal film of 0.6 μm in thickness on a $Si_3N_4$ substrate member showed wear less than $4 \times 10^{-8}$ mg/mm.

The high temperature strength is substantially same with the base ceramic substrate itself or slightly improved.

TABLE 1

| Sample No. | | Metal | Film thick. (μm) | Test temp. (°C.) | Wear (mg/mm) | Friction coeff. Average | Friction coeff. Range* |
|---|---|---|---|---|---|---|---|
| Samples | 1 | Ni | 1.1 | 700 | $6.8 \times 10^{-6}$ | 0.83 | 0.61 |
| | 2 | Ni | 1.1 | 1000 | $2.5 \times 10^{-7}$ | 1.00 | 0.26 |
| | 3 | Ni | 0.5 | 1000 | $5.0 \times 10^{-8}$ or less | 0.87 | 0.34 |
| | 4 | Ni | 0.3 | 1000 | $1.6 \times 10^{-8}$ | 0.89 | 0.26 |
| | 5 | Ni—Cr (Ni 80%) | 0.6 | 1000 | $5.0 \times 10^{-8}$ or less | 0.97 | 0.57 |
| | 6 | Mn | 0.6 | 1000 | $5.0 \times 10^{-8}$ or less | 1.09 | 0.64 |
| | 7 | Cr | 0.6 | 1000 | $5.0 \times 10^{-8}$ or less | 0.55 | 0.12 |
| | 8 | Ni | 3.5 | 1000 | $4.2 \times 10^{-7}$ | 1.02 | 0.30 |
| | 9 | Ni | 8.5 | 1000 | $1.2 \times 10^{-5}$ | 1.03 | 0.30 |
| | 10 | Fe | 0.3 | 1000 | $5.0 \times 10^{-7}$ | 0.44 | 0.27 |
| | 11 | Co | 0.2 | 1000 | $5.0 \times 10^{-8}$ or less | 0.45 | 0.25 |
| Comparison | C1 | — | — | 700 | $5.4 \times 10^{-5}$ | 1.04 | 0.20 |
| | C2 | — | — | 1000 | $1.1 \times 10^{-4}$ | 1.04 | 0.29 |
| | C3 | Cu | 0.9 | 1000 | $1.2 \times 10^{-4}$ | 0.64 | 0.22 |
| | C4 | Ag | 0.4 | 1000 | $1.3 \times 10^{-4}$ | 0.89 | 0.34 |
| | C5 | — | — | 700 | $1.7 \times 10^{-3}$ | 0.83 | 0.34 |
| | C6 | — | — | 1000 | $2.1 \times 10^{-3}$ | 0.80 | 0.18 |

*range of fluctuation

TABLE 2

| Friction and Wear Test Conditions | |
|---|---|
| Sliding speed | 0.2 m/s |
| Applied load (Contact pressure) | 4.1 kgf (1.0 kgf/cm²) |
| Temperature | 700 or 1000° C. |
| Atmosphere | Dry air |

EXAMPLE 2

First, as nitride ceramics substrate members, flat plates (26×26×4 mm) of a silicon nitride sintered body (SN 220 by Kyocera Corporation) were prepared. A 5 mm dia. bore was formed at the center of each of the plates and the plates were polished to a surface roughness of 0.03 μm Rz.

These ceramics substrate members were covered by metals shown in Table 3 by a vacuum vapor deposition using the same vacuum vapor deposition instrument as in Example 1. By the above method, the high temperature sliding elements of Sample Nos. 14 to 17, 20 to 22 were obtained. Further, the elements of Sample Nos. 12, 13, 18 and 19 were obtained by coating nickel on the surface of the substrate members by using a sputtering instrument in which an argon (Ar) gas was used as an introduction gas and a glow discharge was effected at a pressure 4Pa for one hour or longer according to the film thickness.

The obtained high temperature sliding elements were designated as Sample Plates A. On the other hand, flat plates (26×26×4 mm, surface roughness: 0.03 μm Rz) of a silicon nitride sintered body (SN 220 by Kyocera Corporation), the same as the former ceramics substrate members, were machined into such a shape that an annular portion with a 25 mm dia. and a 1 mm thickness projects from one surface (friction surface portion) and further a 10 mm bore was formed at the center thereof. The latter elements were designated as Sample Plates B.

Figure 2:
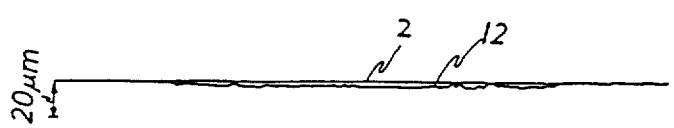
Figure 3:
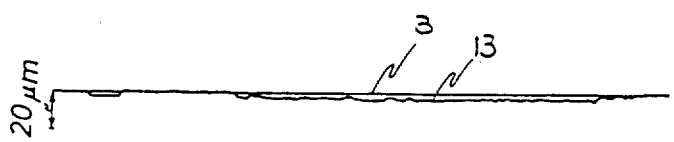

Sample Plates A were mounted on a test piece holder arranged on the rotatable shaft end of a thrust collar type high temperature friction test apparatus, and Sample Plates B were mounted on a test piece holder arranged on the pressurized shaft end of the same apparatus, to conduct a friction and wear test under the test conditions as listed in Table 2. Table 3 shows the test results. The indices of wear rate were obtained in the same way as in Example 1. Further, with respect to Sample Nos. 12 and 13, the cross-sectional profiles of wear scars on the Sample Plates A were recorded by a stylus contact type roughness tester. The recorded results are shown in FIGS. 2 and 3. In the drawings, the reference numerals 2 and 3 denote the outermost surfaces of the Sample Plates A; the numerals 12 and 13 denote the surfaces of wear scars on the Sample Plates A, respectively.

Figure 5:
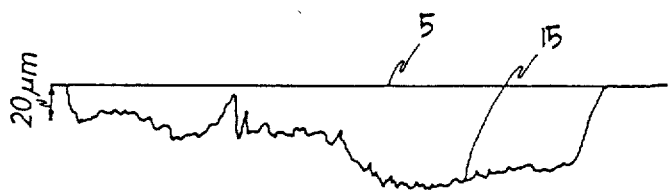
Figure 6:
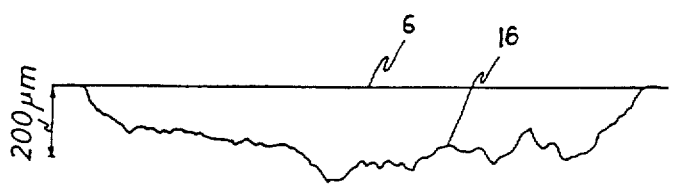
Figure 7:
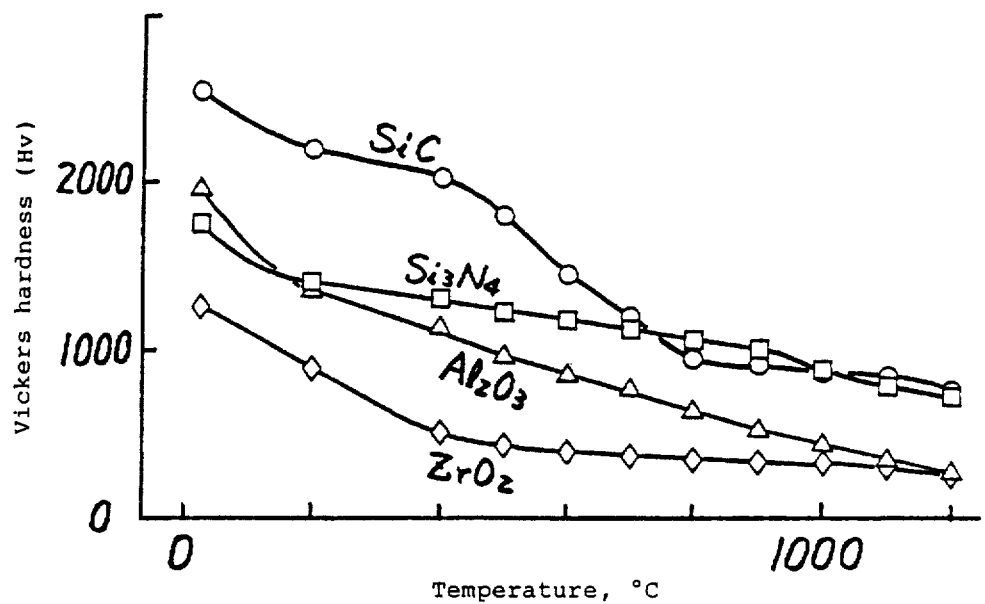
FIG. 7 shows the Vickers hardness (Hv) of various ceramic materials depending upon the temperature.

For comparison, various sample plates were prepared as follows: flat plates of silicon nitride sintered body (the same as the aforementioned ceramic substrate) having no metallic film were prepared as the Sample Plates A (Sample Nos. C7 and C8); the Sample Plates A using other metals as the metallic film were prepared (Sample Nos. C9 to C11). The above sample plates for comparison were tested under the same conditions. The obtained results are shown together. Further, with respect to Sample Nos. C7 and C8, the cross-sectional profiles of wear scars on the Sample Plates A were obtained by the stylus contact type roughness tester. The results are shown in FIGS. 5 and 6. In the drawings, the reference numerals 5 and 6 denote the outermost surfaces of the Sample Plates A, and the numerals 15 and 16 denote the surfaces of wear scars on the Sample Plates A.

The test results shown in Table 3 indicate that the high temperature sliding elements according to the present invention are superior, with respect to wear resistance in a high temperature atmosphere, to other elements prepared for comparison.

Additional testing was conducted, for comparison purpose, on a Ni-coated sample (0.4 μm thick) based on a SiC substrate member. A counterpart sliding member of $Si_3N_4$ was used. After a sliding test at 1000° C., wear of each member was less than $4 \times 10^{-8}$ mg/mm, while the coefficient of friction ($\mu$) was 0.87 (with a fluctuation range of 0.34).

As the experimental results show, the inventive sliding elements have superior sliding properties to the metal material at a temperature range of 500° C. or higher where the general metal material suffers reduction in the strength and shape irregularity, and particularly at a temperature range of 800° C. or higher where even heat resistant alloys cannot be utilized due to the reduction in the strength. Stillmore, the inventive products can be used at a temperature of 1000° C. or higher.

A further comparison testing was made by using a conventional metal sliding element made of "Inconel 751" (trade name) which is a nickel base heat resistant alloy (generally on use for exhaust valve in the automobile engines) at 600° C. The wear was $1.4 \times 10^{-5}$ mg/mm and the coefficient of friction (u) was 0.59 (with u=0.2).

A still further comparison testing was made on the conventional ceramic sliding material including the BN surface layer. Under the dry condition at a high temperature the surface layer wore out, thus turned out insufficient for practical use.

Generally, the ceramic material of the sliding counterpart (or mating member) is not limited so far as it does not react with the coating film material (metal or oxide thereof). However, if some reaction will be apt to occur, the temperature upon use should be limited. For instance, if the coating metal be Ni with $Al_2O_3$ as the sliding counterpart, spinel would be produced upon use at 1000° C. or above entailing damage on the $Al_2O_3$ member.

It should be understood that modifications may be done in the art without departing from the gist and scope of the present invention as disclosed and claimed hereinbelow.

TABLE

| | Sample No. | Metal | Film thick. (μm) | Test temp. (°C.) | Wear (mg/mm) | Friction coeff. Average | Range* |
|---|---|---|---|---|---|---|---|
| Samples | 12 | Ni | 1.1 | 700 | $2.9 \times 10^{-7}$ | 0.85 | 0.15 |
| | 13 | Ni | 1.1 | 1000 | $9.6 \times 10^{-6}$ | 0.63 | 0.15 |
| | 14 | Ni | 0.5 | 1000 | $5.0 \times 10^{-8}$ or less | 0.54 | 0.12 |

TABLE -continued

| Sample No. | | Metal | Film thick. ($\mu$m) | Test temp. (°C.) | Wear (mg/mm) | Friction coeff. Average | Friction coeff. Range* |
|---|---|---|---|---|---|---|---|
| | 15 | Ni | 0.3 | 1000 | $6.2 \times 10^{-8}$ | 0.93 | 0.30 |
| | 16 | Ni—Cr (Ni 80%) | 0.6 | 1000 | $5.0 \times 10^{-8}$ or less | 0.76 | 0.27 |
| | 17 | Mn | 0.6 | 1000 | $5.0 \times 10^{-8}$ or less | 0.61 | 0.29 |
| | 18 | Ni | 3.5 | 1000 | $1.0 \times 10^{-6}$ | 0.86 | 0.14 |
| | 19 | Ni | 8.5 | 1000 | $1.1 \times 10^{-5}$ | 0.88 | 0.20 |
| | 20 | Fe | 0.3 | 1000 | $5.0 \times 10^{-8}$ or less | 0.76 | 0.31 |
| | 21 | Co | 0.2 | 1000 | $8.1 \times 10^{-7}$ | 0.52 | 0.16 |
| | 22 | Kanthal alloy | 0.8 | 1000 | $5.0 \times 10^{-8}$ or less | 0.77 | 0.44 |
| Comparison | C7 | — | — | 700 | $1.5 \times 10^{-4}$ | 0.97 | 0.59 |
| | C8 | — | — | 1000 | $5.7 \times 10^{-4}$ | 0.73 | 0.45 |
| | C9 | Cu | 0.9 | 1000 | $2.2 \times 10^{-4}$ | 0.74 | 0.30 |
| | C10 | Ag | 0.4 | 1000 | $4.7 \times 10^{-4}$ | 0.82 | 0.55 |
| | C11 | Zr | 0.3 | 1000 | $9.9 \times 10^{-4}$ | 0.80 | 0.72 |

*range of fluctuation

What is claimed is:

1. A high temperature sliding element comprising
a carbide or nitride ceramic substrate member,
a metallic film of about 0.1 to 5 $\mu$m in thickness formed on said substrate member by physical vapor deposition, said metallic film being formed of at least one selected from the group consisting of nickel, manganese, chromium, and alloys thereof, and
a sliding surface layer to be slid against a counterpart ceramic member, said sliding surface layer being in the surface of said metallic film,
thereby preventing sliding wear of said sliding element when slid against said counterpart ceramic member at a temperature of 500° C. or higher in an oxygen containing atmosphere to provide an oxidized sliding surface layer of said metallic film.

2. The high temperature sliding element as set forth in claim 1, wherein said carbide ceramics is silicon carbide ceramics.

3. The high temperature sliding element as set forth in claim 1, wherein said nitride ceramics is silicon nitride ceramics.

4. The high temperature sliding element as set forth in claim 1, wherein said sliding surface layer is formed of an oxide of said metal.

5. A high temperature sliding element comprising
a carbide or nitride ceramic substrate member,
a metallic film of about 0.1 to 5 $\mu$m in thickness formed on said substrate member by physical vapor deposition, said metallic film being formed of at least one selected from the group consisting of nickel, manganese, chromium, iron, cobalt and alloys thereof, and
a sliding surface layer to be slid against a counterpart ceramic member, said sliding surface layer being in the surface of said metallic film,
thereby preventing sliding wear of said sliding element when slid against said counterpart ceramic member at a temperature of 500° C. or higher in an oxygen containing atmosphere to provide an oxidized sliding surface layer of said metallic film.

6. The sliding element as defined in Claim 5, wherein said metallic film is formed of at least one selected from the group consisting of iron, cobalt and alloys thereof.

* * * * *